(12) United States Patent
Mohajerani et al.

(10) Patent No.: US 6,381,101 B1
(45) Date of Patent: Apr. 30, 2002

(54) NON CONTACT HEAD LOAD/UNLOAD APPARATUS AND METHOD FOR DISC DRIVES

(75) Inventors: Khosrow Mohajerani, Boulder; Wallis Allen Dague, Louisville, both of CO (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/475,817

(22) Filed: Dec. 30, 1999

Related U.S. Application Data
(60) Provisional application No. 60/130,293, filed on Apr. 21, 1999.

(51) Int. Cl.$^7$ .............................. G11B 5/54; G11B 21/22
(52) U.S. Cl. .............................. 360/254.7; 360/244.9; 360/245.3
(58) Field of Search .................. 360/254.7, 254.8, 360/254.3, 254.4, 255.2, 255.3, 255.6, 255.7, 250, 254, 254.2, 244.2, 244.9, 245, 245.3, 245.4

(56) References Cited

U.S. PATENT DOCUMENTS
6,002,552 A * 12/1999 Leung ........................ 360/104

FOREIGN PATENT DOCUMENTS
| JP | 55-80857 | * | 6/1980 |
| JP | 3-212870 | * | 9/1991 |
| JP | 9-204748 | * | 8/1997 |

* cited by examiner

Primary Examiner—William Klimowicz
(74) Attorney, Agent, or Firm—Kirstin L. Stoll-DeBell; Merchant & Gould P.C.

(57) ABSTRACT

An apparatus and method for minimizing the risk of damage to a disc surface caused by contact between a disc and a slider in a head disc assembly of a disc drive. The apparatus includes a flexure and slider which are biased away from the disc when the disc is stationary and one or more aerodynamic airfoils attached to the flexure. The airfoils are attached to the flexure and extend from the flexure at an angle relative to the disc so as to interact with an air flow caused when the disc spins to force the flexure and the attached slider to move toward the disc during operation of the disc drive.

20 Claims, 4 Drawing Sheets

NON CONTACT HEAD LOAD/UNLOAD APPARATUS AND METHOD FOR DISC DRIVES

RELATED APPLICATIONS

This application claims the benefit of priority of U.S. Provisional Patent Application Serial No. 60/130,293 entitled "NON CONTACT HEAD LOAD/UNLOAD CONCEPT FOR DISC DRIVES," filed Apr. 21, 1999.

FIELD OF THE INVENTION

This application relates generally to the field of disc drive storage devices, and more particularly, to an apparatus and method for minimizing contact and friction between a disc and a head/slider assembly within a disc drive.

BACKGROUND OF THE INVENTION

Disc drives are data storage devices that store digital data in magnetic form on a rotating storage medium, such as a disc. Modern disc drives comprise one or more rigid discs that are coated with a magnetizable medium and mounted on the hub of a drive motor for rotation at a constant high speed. Information is stored on the discs in a plurality of concentric circular tracks typically by an array of transducers ("heads") each mounted on a slider. Each slider is supported on a flexure attached to an actuator arm which is part of an actuator assembly that moves the head relative to the discs. Each transducer, e.g., a magnetoresistive read/write head, is used to transfer data between a desired track and an external environment. During a write operation, the head writes the data onto the disc track, and during a read operation, the head senses the data previously written on the disc track and transfers the information to a disc drive circuit board in the external environment.

The slider with the head is mounted via flexures at the end of an actuator arm that projects radially outward from an actuator body In the actuator assembly. The actuator body pivots about a bearing assembly mounted on a base plate at a position closely adjacent to the outer extreme of the discs. The head(s) read data and transfer it along the actuator arm to a preamplifier which amplifies the signals coming from the heads.

Typically, the actuator assembly includes a voice coil motor to position the heads with respect to the disc surfaces. The actuator voice coil motor includes a coil mounted to the actuator body opposite the actuator arm and is immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body and arm pivot about the bearing assembly and the heads move across the disc surfaces.

Historically, the slider support assembly has been loaded or biased by the flexure so that the slider applies a vertical pressure on the disc surface. During the operation of the disc drive, as the drive motor spins, the air pressure between the disc and slider overcomes the vertical downward pressure and causes the slider assembly to fly slightly above the disc surface at a flying height such that there is no friction between the disc surface and the slider. The actuator assembly is typically positioned with the sliders over a portion of the disc surface that contains no sensitive data when the disc drive is not operating, such as the inner most track or margin of the discs. The inner most track is often called the landing zone and typically contains no magnetic recorded information.

However, this approach contains three inherent problems. First, when the disc drive is subjected to shock, the slider will contact the disc and cause nicks and dings crated on the disc surface. Second, with the ultrasmooth finish of the disc surface used today there can be a stiction force generated between the slider and the disc. Stiction is a frictional force which occurs when the slider rests on the disc surface when the disc is not spinning; stiction prevents immediate motion of the disc relative to the slider when the disc first begins to spin and causes a permanent loss of data at the point where the slider touches the disc. Third, the landing zone wastes valuable disc surface space which could otherwise be used to store more data, increasing the value of the disc drive.

One solution to these problems is to provide a loading ramp located beyond the outer diameter of the disc in a disc drive. When the disc drive is not operating, the slider is driven out of the disc area and loaded and parked onto the ramp. In this way, the loading ramp frees up the storage space on the inner diameter of the disc. However, loading ramps can cause the problem of wear particle generation within the disc drive. Loading ramps also may cause the problem of scratching and nicking of the tracks near the outer diameter of the disc surface caused when the slider contacts the disc surface during the loading and unloading of the slider on the ramp. Thus, typically a landing zone is created on the outer diameter of the disc which can waste actually more valuable disc space than the landing zone on the inner diameter of the disc.

Another solution is to load the actuator assembly such that the slider is biased away from the surface of the disc when the disc is at a standstill. In this way, the entire disc surface could be used to store data. However, with the slider biased away from the disc surface, there must be a force to move the slider towards the disc surface and into flying height when the disc is spinning during the operation of the disc drive.

One problematic way to achieve this force is to include a pair of aerodynamic wings on the slider. As the disc rotates, wind generated by the disc rotation pushes against the wings and forces the slider towards the disc until the slider reaches flying height. However, disc drives and disc drive components, including sliders, are becoming smaller and smaller, and it is difficult, if not impossible, to attach a pair of wings large enough to create sufficient force to move the small sized sliders contained in modern disc drives. Additionally, providing aerodynamic wings on the slider interferes with the pitch and roll angle of the slider, which pitch and roll angle is critical for proper function of the disc drive.

Another problematic way to create a force which moves the slider towards the disc during disc drive operation is to include an aerodynamic airfoil formed out of the actuator arm which exerts a negative lift force towards the disc and thereby moves the slider into flying height position. However, the size of the airfoil is limited by the diameter of the actuator arm and therefore may not provide enough force in smaller disc drives. Also, the size and angle of the airfoil is limited by the distance between the slider and the disc surface, and thus, the airfoil may not be large enough to create sufficient downward force in smaller disc drives.

SUMMARY OF THE INVENTION

Against this backdrop the present invention has been developed. It is thus desirable to provide an apparatus and method which minimizes the risk of damage to a disc surface caused by contact between a disc and a slider which will be effective in smaller disc drives and which will not interfere with the operation of the disc drive.

A head disc assembly in a disc drive has a base plate and a top cover which encloses a drive motor, a disc supported thereon, and an actuator assembly. The disc spins at a given velocity during operation of the disc drive which causes air flow within the head disc assembly. The actuator assembly has an actuator arm which transfers data to and from the disc.

A flexure has one end connected to the slider and an opposite end connected to the actuator arm. When the disc is stationary, the flexure and the slider are biased away from the disc. One or more airfoils are attached to the flexure and extend from the flexure at an angle relative to the disc so as to interact with the air flow to force the flexure and the attached slider to move toward the disc during operation of the disc drive.

These and various other features as well as advantages which characterize the present invention will be apparent from a reading of the following detailed description and a review of the associated drawings.

DETAILED DESCRIPTION

Figure 1:
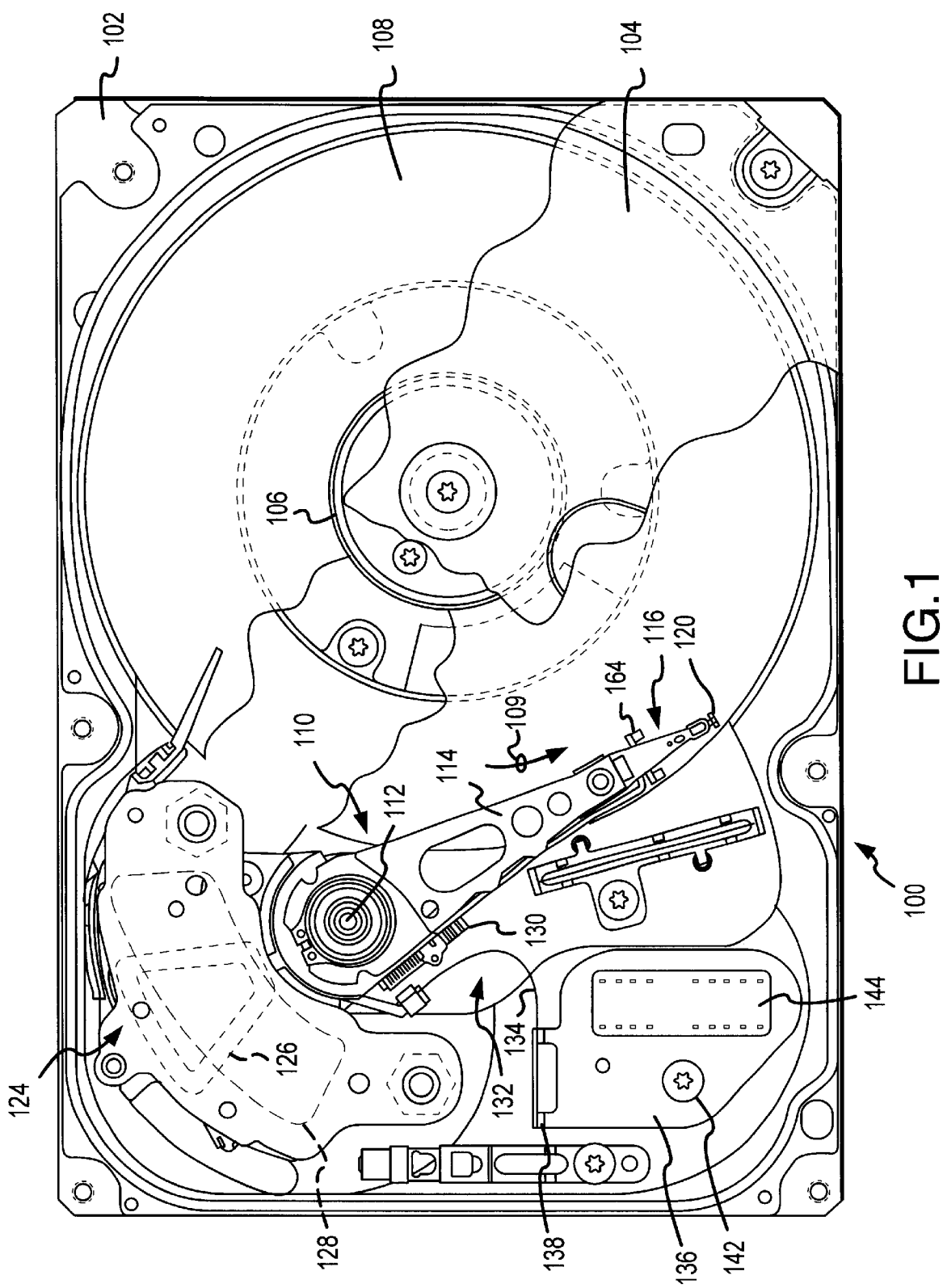
FIG. 1 is a plan view of a disc drive head disc assembly incorporating aerodynamic airfoils in accordance with one preferred embodiment of the invention with the head disc assembly cover partially broken away.

A disc drive 100 constructed in accordance with one preferred embodiment of the present invention is shown in FIG. 1. The disc drive 100 includes a metal base plate 102 to which various components of the disc drive 100 are mounted. A metal top cover 104 cooperates with the base plate 102 to form an internal, sealed environment for the disc drive components in a conventional manner. The components include a drive motor 106 which rotates one or more discs 108 at a constant high speed in the direction of arrow 109. Information is written to and read from tracks on each of the discs 108 through the use of an actuator assembly 110, which rotates about a bearing shaft assembly 112 positioned adjacent the discs 108. The actuator assembly 110 further includes an actuator body, or E-Block, having one or more actuator arms 114, which extend towards the discs 108, with one or more flexures 116 extending from each actuator arm 114. Mounted at the distal end 117 of each of the flexures 116 is an air bearing slider 120 including a read/write head 118. The slider 120 enables the head 118 to fly in close proximity (or at a "flying height") above the corresponding surface of the associated disc 108. The flying height is a height at which the head can read from and write data onto a disc while not touching the disc surface.

The radial position of the slider 120 and its head 118 is controlled through the use of a voice coil motor (VCM) 124. The VCM 124 typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex circuit 132 provides the requisite: electrical connection paths for the actuator assembly 110 while allowing pivotal movement of the actuator assembly 110 during operation. The flex circuit includes a preamplifier 130, a flexible ribbon portion 134, and a fixed ribbon portion 136. Head wires or electrical traces (not shown) are connected from the heads 118 along the flexures 116 and routed along the actuator arm 114 to the preamplifier 130. The preamplifier 130 typically includes circuitry for controlling the write currents applied to the heads 118 during a write operation and for amplifying read signals generated by the heads 118 during a read operation. The flexible ribbon portion 134 of the flex circuit 132 connects the preamplifier 130 to the fixed portion 136 of the flex circuit 132. The fixed portion 136 of the flex circuit 132 is mounted to a flex circuit support bracket 138 which is, in turn, mounted to the base plate 102 with a flex bracket screw 142.

A pair of aerodynamic airfoils or wings 164 are attached to the flexure 116 at an angle with respect to the disc surface such that when the disc 108 begins to spin and generate air movement the air will flow onto upper surfaces of the airfoils 164, as shown in FIG. 1. The force of air flow against the airfoils 164, and thus, the flexure 116 and the slider 120, forces the slider 120 towards the surface of the disc 108. As the disc 108 spins at a given velocity, an opposing force arising from the air layer adjacent the surface of the spinning disc 108 will push against an air bearing surface on the slider 120 and lift the slider 120 away from the surface of the disc 108. These counterbalancing forces act to position the slider 120 and the head 118 at an optimal flying height above the disc for reading data from or writing data to the disc 108 without causing the slider 120 to contact the disc 108.

In the preferred embodiment of the present invention, the airfoils 164 are sufficiently rigid such that they will not deform after extended use or under air pressure during disc drive operation. The size, shape, and angle of the airfoils 164 are configured as a function of the velocity of the disc 108 during operation of the disc drive 100 to balance the slider 120 at flying height during disc drive operation.

Figure 2:
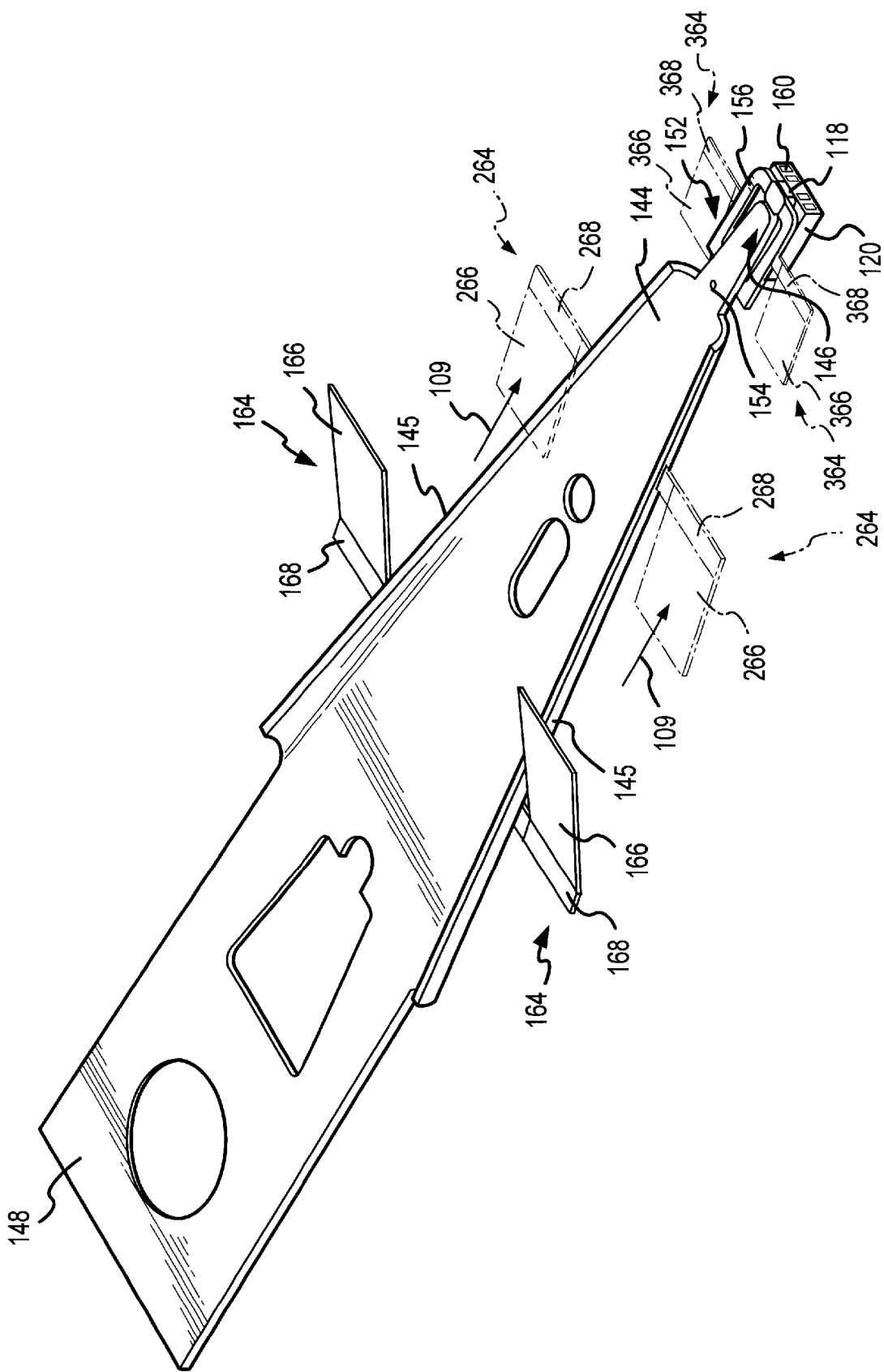
FIG. 2 is a separate perspective view of the flexure with attached airfoils in accordance with a preferred embodiment of the invention and illustrates the positioning of two alternative embodiments with dashed lines.
Figure 4:
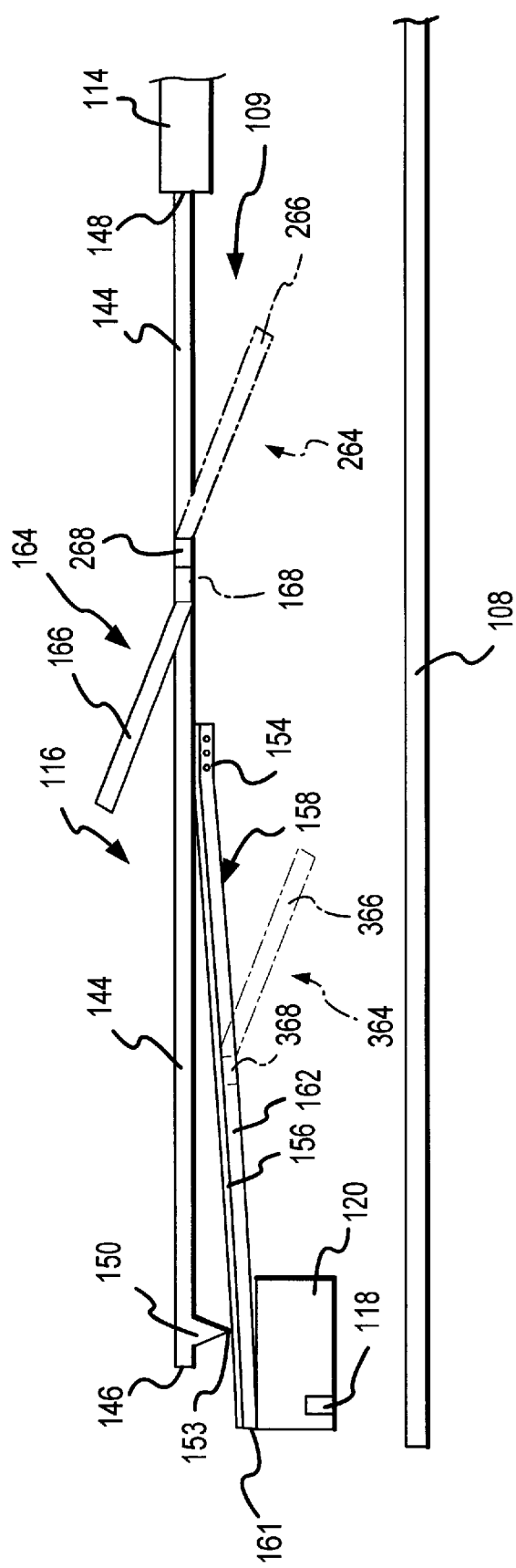
FIG. 4 illustrates a side view of the flexure depicted in FIG. 2 showing the two alternative embodiments with dashed lines.

FIG. 2 illustrates a separate perspective view of the flexure 116 with attached airfoils 164 in accordance with one preferred embodiment of the invention shown in FIG. 1. In addition two alternative preferred embodiments 264 and 364, described in more detail below, are shown by dashed lines in FIGS. 2 and 4. Referring specifically now to FIGS. 2 and 4, the flexure 116 includes a load beam 144 and a flex cable 152. The load beam 144 has a distal end 146 positioned near the slider 120 and an opposite end 148 which is attached to the actuator arm 114 (not shown in FIG. 2). The flex cable 152 is attached to the load beam 144 by welding points at apertures 153 and 154 along the load beam 144, as best seen in FIG. 4. The flex cable 152 includes a carrier 156, made of polyamide or other preferably suitable materials, electrical traces (not shown), and a gimbal insert 158. The gimbal insert 158 is preferably a metallic material, for example iron-chromium (FeCr). The gimbal insert is U-shaped with distal end 161 and opposite sides 162. Airfoils 164 are attached to the load beam 144 and are angled towards the disc 108.

FIG. 2 also shows two alternative embodiments of the present invention with dashed lines. In one alternative preferred embodiment, a pair of airfoils 264 are attached to the load beam 144 and angle toward the disc 108. In another preferred embodiment, airfoils 364 are attached to sides 162 of the gimbal insert 158 and are angled towards the disc 108. Airfoils 364 may also be attached to the gimbal insert 158 and angled away from the disc similar to airfoils 164.

Figure 3:
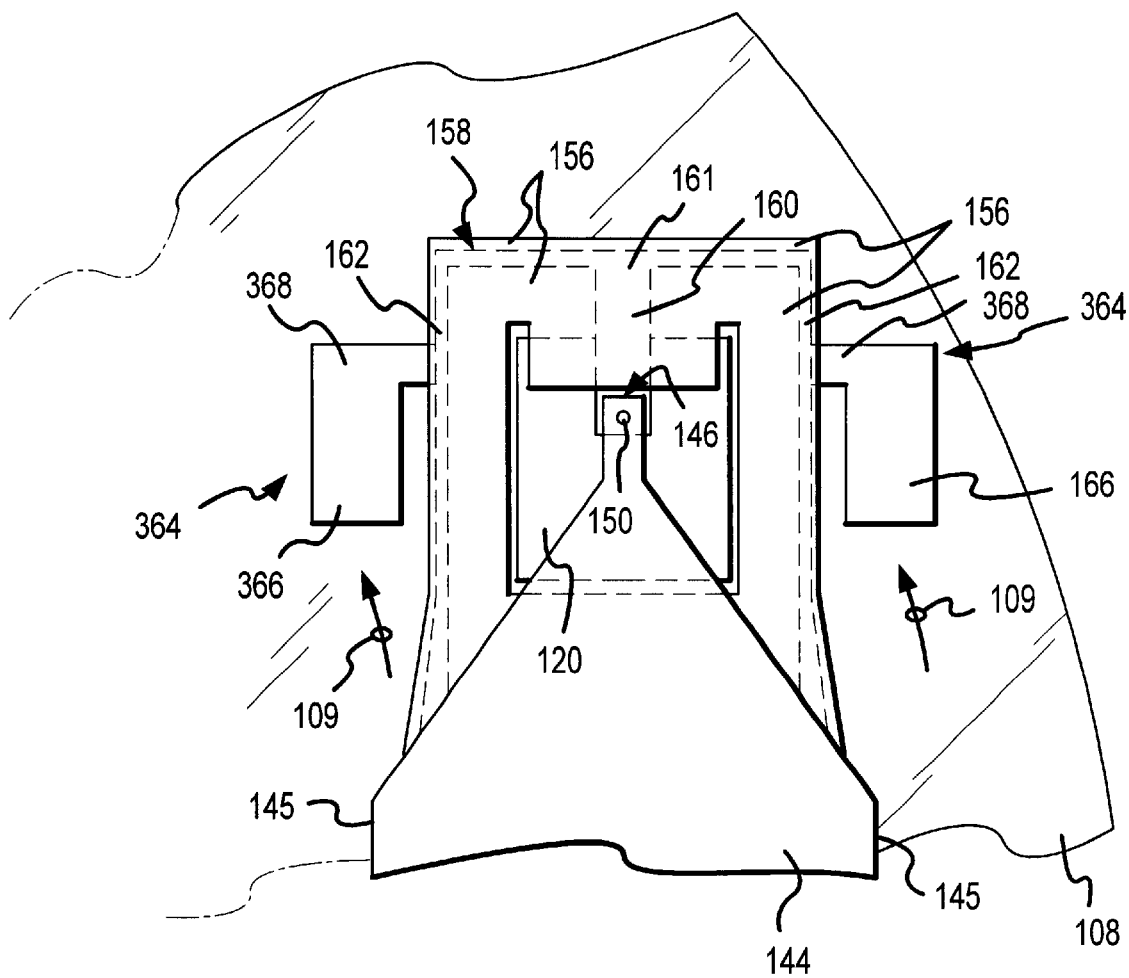
FIG. 3 shows an enlarged top view of the head support end of the flexure in FIG. 2 with airfoils attached to the head carrier in accordance with one of the alternative preferred embodiments of the present invention.

FIG. 3 shows an enlarged top view of the gimbal insert end of the flexure 116 in accordance with the second alternative preferred embodiment of the present invention just mentioned. A central arm 160 of the gimbal insert 158 extends away from distal end 161 of the gimbal insert 158 back toward the load beam 144. The slider 120 is mounted to central arm 160 of the gimbal insert 158 such that the electrical traces are electrically coupled to the magnetic head 118 on the slider 120. Airfoils 364 are each fastened to one of the sides 162 of the gimbal insert 158 and extend outward from flexure 116. Since the airfoils 364 are connected to the sides 162 and the slider 120 is connected to central arm 160, the air flow over the airfoils 364 will not affect the pitch and roll angle of slider 120. The air flow force will act against the sides 162 of the gimbal insert 158.

As shown in FIG. 4, the slider 120 is mounted or attached to central arm 160 of gimbal insert 158 such that when flex cable 152 is attached to load beam 144 via welding points 153 and 154, a load tab or button 150 on load beam 144 applies pre-load force on flex cable 152, and thus on slider 120, such that the slider 120 is biased away from the disc 108 when the disc 108 is not spinning.

As best seen in FIG. 4, a side view of the invention depicted in FIG. 2, the airfoils 164 each include a body 166 and base 168. The base 168 is a flat piece of material positioned in the same plane as the flexure 116 and is attached to outer edges of the flexure 116, i.e., to the outer edges 145 of the load beam 144. The body 166 of the airfoil 164 is angled away from the plane of the airfoil base 168.

In another preferred embodiment of the present invention shown by dashed lines in FIG. 4, the airfoils 264 each include an airfoil body 266 and an airfoil base 268. The airfoil bases 268 are attached to the outer edges 145 of the load beam 144. The length of airfoils 264 are also not limited by the distance between the slider 120 and the disc 108 because the airfoils may extend away from the plane of the flexure 116 in a direction away from the disc 108, as shown in FIG. 1.

The width of the airfoils 164 or 264 is not limited by the size and width of the load beam 144 since the airfoils 164 or 264 are attached to outer edges 145 of the load beam 144. Alternatively, the airfoils 164 or 264 may be formed integrally with the outer edges 145 of the load beam 144. Also, a single airfoil 164 or 264 could be attached to the middle of the load beam 144 and extend outward from the middle of the load beam 144.

In the second preferred embodiment of the present invention shown by dashed lines in FIGS. 2 and 4, the airfoil 364 includes an airfoil body 366 and an airfoil base 368. The airfoil bases 368 are attached to the sides 162 of the gimbal insert 158. The airfoils 364 may be attached at any point along the sides 162 of the gimbal insert 158. The airfoils 364 may be attached with welding points, adhesive, or any other conventional attaching means. Alternatively, the airfoils 364 may be formed integrally with gimbal insert 158. Since the airfoils 364 are attached to the sides 162 of the gimbal insert 158, and not the central arm 160, the air flow over the airfoils 364 will not affect the pitch and roll angle of the slider 120.

The airfoil body 166, 266, or 366 may be of any size, shape, or angle as is necessary to create the right amount of force on the flexure 116 to balance the opposite force from the disc such that the slider 120 is positioned at flying height while the disc 108 is spinning at operating speed. The size, shape, and angle of the airfoil body 166, 266, or 366 will depend upon many factors including, but not limited to, the number of discs 108 in the disc drive 100, the speed at which the disc 108 spins at operating speed, the size of the disc drive 100 and its components, and the material composition of the disc drive components.

As shown in FIGS. 1 and 3, the body 166 or 366 of the airfoil 164 or 364 is generally aligned with the direction of air flow 109 creating a force sufficient to move the slider 120 towards the disc during disc drive 100 operation when the actuator arm 114 occupies any position between the inner and outer diameters of the disc 108. Since the slider 120 only moves a matter of a few centimeters between the inner diameter and outer diameter of the disc 108, the difference between the force caused by airflow over airfoils 164 or 364 at the inner diameter and the outer diameter of the disc 108 is negligible.

In summary, the present invention preferably is an apparatus for minimizing contact between a slider (such as 120) and a disc (such as 108) within a head disc assembly in a disc drive (such as 100). The head disc assembly has a base plate (such as 102) and a top cover (such as 104) which encloses a drive motor (such as 106) and an actuator assembly (such as 110). The spinning disc (such as 108) causes air flow within the head disc assembly. The drive motor (such as 106) supports a disc (such as 108) which spins at a given velocity during disc drive operation. The head disc assembly also has an actuator assembly (such as 110) including an actuator arm (such as 114) for transferring data to and from the disc (such as 108).

A flexure (such as 116) has one end (such as 117) connected to the slider (such as 120) and an opposite end connected to the actuator arm (such as 114) and the flexure (such as 116) and the slider (such as 120) are biased away from the disc (such as 108) when the disc drive is not in operation. One or more airfoils (such as 164, 264, or 364) are attached to the flexure (such as 116) and extends from the flexure (such as 116) at an angle relative to the disc (such as 108) so as to interact with the air flow to force the flexure (such as 116) and the attached slider (such as 120) to move toward the disc (such as 108) during operation of the disc drive (such as 100).

The flexure (116) has a load beam (such as 144) and a flex cable (such as 152). The load beam (such as 144) has one end (such as 148) connected to the actuator arm (such as 114). The flex cable (such as 152) is connected to an opposite end (such as 146) of the load beam (such as 144) from the actuator arm (such as 114) and comprises a carrier (such as 156) and a U-shaped gimbal insert (such as 158) having a distal end (such as 161), two opposite side portions (such as 162) extending toward the actuator arm (such as 114) and fastened to the load beam (such as 144), and a central arm (such as 160) extending from the distal end (such as 161) of the gimbal insert (such as 158) toward the actuator arm (such as 114), wherein the slider (such as 120) is connected to the central arm (such as 160) on the gimbal insert (such as 158).

The airfoils (such as 364) may be attached to side portions (such as 162) of the gimbal insert (such as 158) or may be formed integrally with the side portions (such as 162) of the gimbal insert (such as 158). Alternatively, the airfoils such as (164 or 264) may be attached to the load beam (such as 144) or may be formed integrally with the load beam (such as 144). The airfoils (such as 164) may have at least a portion (such as 166) which extends above the flexure (such as 116) and away from the disc (such as 108). Alternatively, a portion (such as 266 or 366) of the airfoils (such as 264 or 364) may extend towards the disc (such as 108). The airfoils (such as 164, 264, or 364) are substantially rigid.

A method for minimizing damage to a disc within a head disc assembly in a disc drive is as follows. The flexure (such as 116) is loaded onto the actuator arm (such as 114) such that the slider (such as 120) is biased away from the disc (such as 108) when the disc is stationary. At least one airfoil (such as 164, 264, and 364) is affixed on the flexure (such as 116) to react with the air flow and force the flexure (such as 116) and the slider (such as 120) toward the disc (such as 108) during operation of the disc drive (such as 100). The slider (such as 120) floats on a layer of air such that the slider (such as 120) maintains a desired flying height above the disc (such as 108) during operation of the disc drive (such as 100). The airfoil (such as 164, 264, or 364) may be affixed by forming the airfoil (such as 164, 264, or 364) integrally with the flexure (such as 116) or by attaching a separate airfoil (such as 164, 264, or 364) to the flexure (such as 116) with welding points.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art. For example, the present invention may contain a single airfoil or any number of airfoils. A pair of airfoils could be attached to the gimbal insert and a pair of airfoils could be attached to the load beam. A portion of the airfoil could extend toward the disc and a portion could extend away from the disc. Accordingly, all such modifications, changes and alternatives are encompassed in the spirit of the invention disclosed and as defined in the appended claims.

What is claimed is:

1. An apparatus for minimizing contact between a slider and a disc within a head disc assembly in a disc drive, the head disc assembly having a base plate and a top cover enclosing a drive motor supporting a disc spinning at a given velocity during disc drive operation and an actuator assembly having an actuator arm for transferring data to and from the disc, the spinning disc causing air flow within the head disc assembly, the apparatus comprising:

a flexure having one end connected to the slider and an opposite end connected to the actuator arm, the flexure and the slider being biased away from the disc when the disc drive is not in operation; and an airfoil attached to an outer side edge of the flexure and extending from the flexure at an angle relative to the disc so as to interact with the air flow to force the flexure and the attached slider to move toward the disc during operation of the disc drive.

2. The apparatus of claim 1 further comprising another airfoil attached to a second outer side edge of the flexure and extending from the flexure.

3. The apparatus of claim 1 wherein the flexure comprises:

a load beam having one end connected to the actuator arm; and a flex cable connected to an opposite end of the load beam from the actuator arm, the flex cable comprising a carrier and a U-shaped gimbal insert having a distal end, two opposite side portions extending toward the actuator arm and fastened to the opposite side of the load beam, and a central arm extending from the distal end of the gimbal insert toward the actuator arm, wherein the slider is connected to the central arm on the gimbal insert.

4. The apparatus of claim 3 wherein an airfoil is attached to one side portion of the gimbal insert, and another airfoil is attached to the other side portion of the gimbal insert.

5. The apparatus of claim 3 wherein one airfoil is attached to one side of the load beam, and another airfoil is attached to the opposite side of the load beam.

6. The apparatus of claim 4 wherein the airfoils are formed integrally with the gimbal insert.

7. The apparatus of claim 5 wherein the airfoils are formed integrally with the load beam.

8. The apparatus of claim 1 wherein at least a portion of the airfoil extends above the flexure and away from the disc.

9. The apparatus of claim 1 wherein at least a portion of the airfoil extends towards the disc.

10. The apparatus of claim 1 further comprising a pair of airfoils extending toward the disc.

11. The apparatus of claim 1 wherein the airfoil is substantially rigid.

12. A method for minimizing damage to a disc within a head disc assembly in a disc drive, the head disc assembly including a base plate, a disc drive motor, a disc supported on the drive motor for rotation at a given velocity creating an air flow within the head disc assembly during operation of the disc drive, and an actuator assembly mounted to the base plate having an actuator arm, and a flexure attached at one end to the actuator arm supporting a slider attached to an opposite end of the flexure from the actuator arm; the method comprising steps of:

a) loading the flexure onto the actuator arm such that the slider is biased away from the disc when the disc is stationary;

b) affixing an airfoil to an outer side edge of the flexure for reacting with the air flow to force the flexure and the slider toward the disc during operation of the disc drive; and c) floating the slider on a layer of air such that the slider maintains a desired flying height above the disc during operation of the disc drive.

13. The method of claim 12 wherein the step b) of affixing comprises:

forming the airfoil integrally with the flexure.

14. The method of claim 12 wherein the step b) of affixing comprises:

welding a separate airfoil to flexure with welding points.

15. The method of claim 12 wherein the flexure includes a gimbal insert supporting a slider and the step b) of affixing comprises the step of:

b)(i) fastening the airfoil to the gimbal insert.

16. The method step of claim 15 wherein step b) further comprises the step of:

b)(ii) fastening another airfoil to the gimbal insert.

17. A disc drive comprising:

a head disc assembly having a base plate and a top cover enclosing a drive motor carrying a disc spinning at a given velocity during disc drive operation and an actuator assembly having an actuator arm, the spinning disc causing an air flow within the head disc assembly;

a flexure having one end connected to the actuator arm and a slider connected to the other end of the flexure having an air bearing surface, the flexure being biased away from the disc when the disc drive is not in operation and; and an airfoil attached to an outer side edge of the flexure and extending outward from the flexure at an angle relative to the disc for interacting with the air flow to force the flexure and attached slider to move towards the disc during operation of the disc drive.

18. The disc drive of claim 17 further including:

a second airfoil attached to a second outer edge of the flexure extending outward from the flexure at an angle relative to the disc.

19. The disc drive of claim 18 wherein the flexure comprises a gimbal insert supporting the slider and the first and second airfoils are attached to the gimbal insert.

20. An apparatus for minimizing contact between a slider and a disc within a head disc assembly in a disc drive, the apparatus comprising:

a head disc assembly having a base plate and a top cover enclosing a drive motor about which the disc spins at a given velocity during disc drive operation causing air flow within the head disc assembly and an actuator assembly having an actuator arm, a flexure having one end connected to a slider and an opposite end connected to the actuator arm, the flexure and the slider being biased away from the disc when the disc is stationary; and aerodynamic means attached to an outer side edge of the flexure extending outward from the flexure for engaging the airflow to force the slider toward the disc during drive operation.

* * * * *